United States Patent [19]
Palmer

[11] Patent Number: 4,714,307
[45] Date of Patent: Dec. 22, 1987

[54] CATADIOPTRIC INFRARED LENSES

[75] Inventor: John M. Palmer, Clwyd, Wales

[73] Assignee: Pilkington P.E. Limited, United Kingdom

[21] Appl. No.: 883,919

[22] Filed: Jul. 10, 1986

[30] Foreign Application Priority Data

Jul. 13, 1985 [GB] United Kingdom ............... 8517727

[51] Int. Cl.⁴ .................. G02B 17/08; G02B 13/14
[52] U.S. Cl. ..................... 350/1.3; 350/1.4; 350/443; 350/444
[58] Field of Search ............ 350/1.1, 1.2, 1.3, 1.4, 350/442, 443, 444

[56] References Cited

U.S. PATENT DOCUMENTS

| | | | |
|---|---|---|---|
| 3,507,556 | 4/1970 | Shimizu | 350/201 |
| 3,632,190 | 1/1972 | Shimizu | 350/201 |
| 4,061,420 | 12/1977 | Kaprelian et al. | 350/444 |
| 4,188,091 | 2/1980 | Fujii | 350/201 |
| 4,403,836 | 9/1983 | Mihara | 350/444 |
| 4,600,265 | 7/1986 | Norrie | 350/1.3 |

FOREIGN PATENT DOCUMENTS 1530066 10/1978 United Kingdom ............... 350/1.4

Primary Examiner—John K. Corbin
Assistant Examiner—Martin Lerner
Attorney, Agent, or Firm—F. Eugene Davis, IV; Mark P. Stone

[57] ABSTRACT

An apochromatic catadioptric lens is provided which can operate in the 3 to 5 and the 8 to 12 micron wavebands. The lens comprises a primary mirror having an opening and a Mangin secondary mirror for directing light of the required wavebands through the opening. In the light paths between the primary mirror and Mangin secondary mirror are a pair of refracting lens elements of optically transmissive materials different from each other and from that of the Mangin secondary mirror. Preferably, the Mangin secondary mirror is of germanium, the refracting lens element of the pair nearer the Mangin secondary mirror is of zinc sulphide and the refracting lens element of the pair further from the Mangin secondary mirror is of zinc selenide. The invention also extends to an afocal telescope of non-Galilean form incorporating such a lens.

16 Claims, 1 Drawing Figure

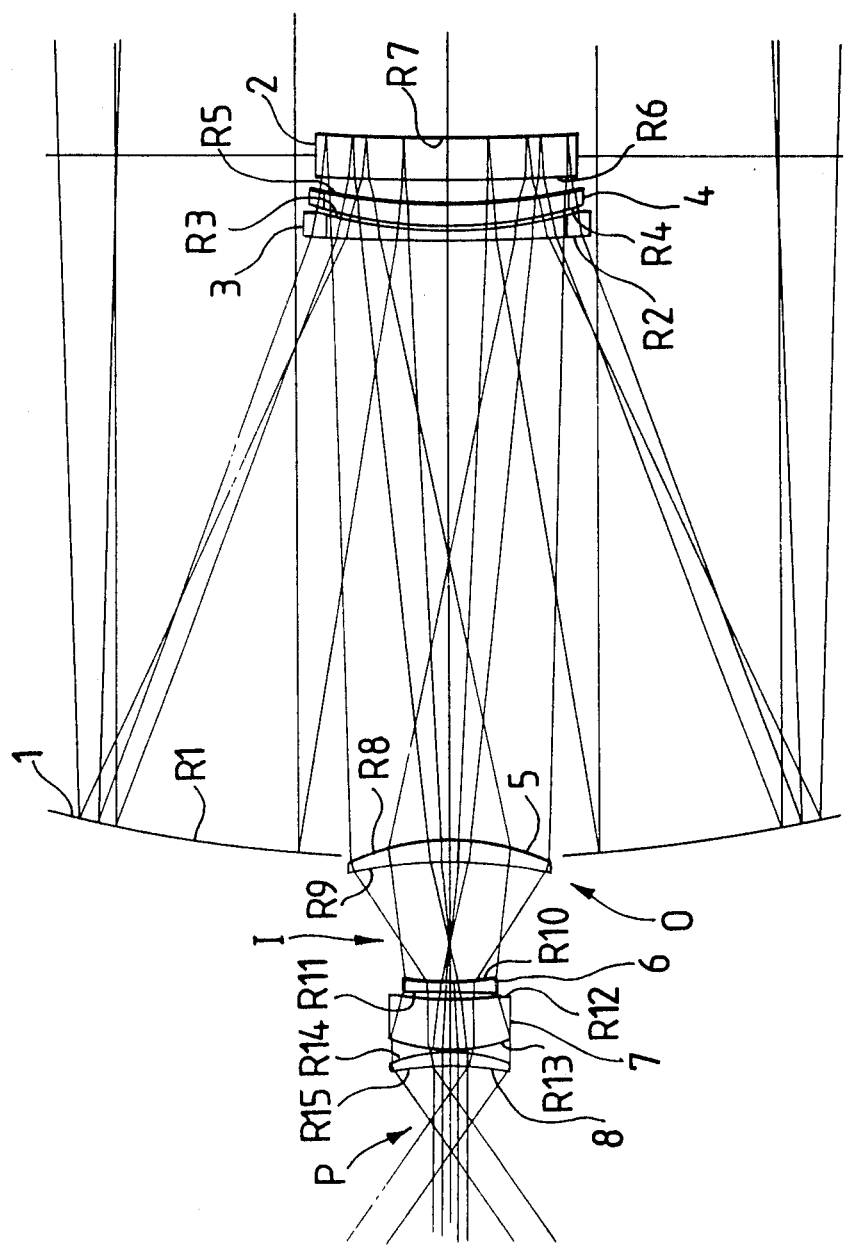

CATADIOPTRIC INFRARED LENSES

BACKGROUND OF THE INVENTION

This invention concerns improvements in or relating to lenses and relates more particularly to lenses, and to afocal telescopes, for use at infra-red wavelengths.

Infra-red lenses and afocal telescopes are known which operate in the 3 to 5 micron waveband, as are infra-red lenses and afocal telescopes which operate in the 8 to 12 micron waveband. The differences usually lie basically in the infra-red transmitting materials employed. Infra-red transmitting materials tend to have a high rate of change of refractive index with wavelength and hence give rise to serious problems of chromatic aberration. These problems are enhanced by increasing the required operative waveband and are therefore very considerable if one lens or telescope is required to operate over both the 3 to 5 and the 8 to 12 microns wavebands.

SUMMARY OF THE INVENTION

According to the present invention there is provided a catadioptric lens comprising a primary mirror having an opening, a Mangin secondary mirror of a first optically transmissive material, and a pair of refracting lens elements respectively of second and third optically transmissive materials different from each other and from said first optically transmissive material, said pair of elements being disposed in the light paths between the primary mirror and the Mangin secondary mirror and between the Mangin secondary mirror and the opening in the primary mirror.

The term 'optically transmissive' is to be understood as meaning that the material has a useful transmission of light in the spectral waveband or wavebands over which the lens is to operate. It is further to be understood that the term 'light' is not intended to be limited to visible radiation but is to be construed broadly enough to include, as the context permits, non-visible wavelengths and in particular infra-red wavelengths.

The use of three different optically transmissive materials for the Mangin secondary mirror and the pair of elements enables a substantially apochromatic system to be achieved. The lens may be operative over a plurality of wavebands, or over a wide waveband encompassing a plurality of useful narrower wavebands. For example, the lens may be operative over a 3 to 12 micron infra-red waveband so as to encompass the dual thermal wavebands of 3 to 5 microns and 8 to 12 microns. In this case the three different materials may be germanium, zinc sulphide, and zinc selenide and, in particular, the Mangin secondary mirror may be of germanium, the element of the pair nearer the Mangin secondary mirror may be of zinc sulphide, and the element of the pair further from the Mangin secondary mirror may be of zinc selenide.

The pair of elements may be closely spaced and may be of meniscus form concave towards the Mangin secondary mirror, which may have a convex front surface and an externally concave (internally convex) back reflecting surface. One of the elements of the pair is preferably of positive power while the other is of negative power, and in particular the element further from the Mangin secondary mirror may be negatively powered and the element nearer the Mangin secondary mirror may be positively powered.

The catadioptric lens may comprise a further refractive lens element of optically transmissive material at or near the opening in the primary mirror, which further element may be of positive power and may be of meniscus shape convex towards the Mangin secondary mirror. For the 3 to 12 micron waveband said further element may be of germanium.

The catadioptric lens may be associated with an eyepiece system, and may in particular be arranged to provide therewith an afocal telescope of non-Galilean form, and the invention further provides such a telescope.

The eyepiece system may comprise three refractive lens elements of optically transmissive material, which may be germanium for the 3 to 12 micron waveband. Such three elements may be a negatively powered front element (i.e. towards the catadioptric lens), which may be biconcave, a central positively powered element having a convex rear surface and which may be meniscus in shape, and a back positively powered element with a convex front surface and a curved rear surface and which may be meniscus in shape.

The primary mirror of the catadioptric lens is preferably a front surface mirror of spherical curvature. The refracting surfaces of the lens elements, and the reflecting surface of the Mangin secondary mirror, are preferably all of spherical curvature. However, one or more aspheric surfaces could be employed if desired.

BRIEF DESCRIPTION OF THE DRAWING

A preferred embodiment of the invention will now be described, by way of example, with reference to the accompanying drawing which is a schematic representation of a non-Galilean afocal telescope having a catadioptric objective lens system in combination with an eyepiece system.

DESCRIPTION OF THE PREFERRED EMBODIMENT

The catadioptric lens comprises a primary mirror 1 having a concave reflecting front surface R1 and a central opening or aperture 0. The primary mirror 1 receives light from a distant scene or object and reflects it towards a Mangin secondary mirror 2 having a convex refracting front surface R6 and an externally concave (internally convex) reflecting surface R7. Light internally reflected by the Mangin mirror travels towards the opening 0 in the primary mirror.

Located in the light path between the primary mirror 1 and the Mangin secondary mirror 2, and also in the light path between the latter and the opening 0, is a pair of closely spaced refractory lens elements 3 and 4. The front element 3 of the pair (i.e. the element further from the Mangin mirror 2) is a negatively powered meniscus element with a convex front surface R2 and a concave rear surface R3 facing towards the Mangin mirror 2. The element 4 of the pair nearer the Mangin mirror 2 is a positively powered meniscus element with a convex front surface R4 and a concave rear surface R5 facing towards the Mangin mirror 2. It will be seen that light reflected from the surface R1 of the primary mirror traverses the refracting surfaces R2, R3, R4, R5 and R6 during its travel to the Mangin reflecting surface R7, and after reflection from the latter traverses these surfaces (in reverse order) again during its travel towards the opening 0.

At or near the opening 0 is a further refractive lens element 5 which is positively powered and of meniscus form with a convex surface R8 facing towards the Mangin mirror 2 and a concave surface R9 facing towards an image position I at which the catadioptric lens produces a real image of the distant scene or object. This intermediate image in the telescope is viewed by the eyepiece system or collimator which consists of three refractive elements 6, 7 and 8. The front element 6, i.e. the element nearest the image position I, is negatively powered with concave front and back surfaces R10 and R11. The middle element 7 is a relatively thick, positively powered meniscus element with a concave front surface R12 and a convex rear surface R13. The back element 8 of the eyepiece is a positively powered meniscus element with a front convex surface R14 and a rear concave surface R15. The eyepiece produces a collimated magnified view of the scene or object at a real exit pupil P.

The Mangin mirror 2 and the lens elements 3 to 8 are all of optically transmissive material. However, the Mangin mirror 2 and the elements 3 and 4 of the pair are of different respective optically transmissive materials. Thus, the Mangin mirror 2 is of a first material, the element 3 is of a second material different from the first, and the element 4 is of a third material different from the first and from the second. By the use of different optically transmissive materials for these elements a lens can be designed to operate satisfactorily over two respective wavebands, or a relatively broad waveband encompassing the two. With materials of significantly differing chromatic properties it is possible to develop equations of chromatic aberration of a cubic form whose roots have three zeros and hence the turning point of the function can be arranged to cover the two wavebands of interest. An apochromatised design can therefore be achieved.

In particular a lens and telescope operative over the 3 to 12 micron waveband, and hence usable for 3 to 5 microns and/or 8 to 12 microns, can be provided.

The element 5, and the eyepiece elements 6, 7 and 8 may be of the same optically transmissive material as the Mangin mirror 2.

The spaces between the solid elements are gas, and conveniently air.

The reflecting surfaces R1 and R7, and the refracting surfaces R2 to R6 and R8 to R15 are preferably all of spherical curvature (although aspherics could be used if required).

The primary mirror 1 has no chromatic aberration but a large spherical aberration contribution. This is corrected by refraction in the secondary group constituted by the Mangin secondary mirror 2 and the lens elements 3 and 4. Such spherical aberration correction tends to introduce chromatic aberration if a material with significant dispersion is involved. This chromatic aberration is also corrected in the secondary group by employing the three optically dissimilar materials for the respective three elements to generate a cubic form of focal length variation over the wavelength range. Reasonably robust and stable practical materials which transmit over the required wide waveband are used and the power structure is such as to satisfy the geometry and chromatic requirements. The order of arranging the materials gives satisfactory lens shapes for the monochromatic correction. With a low power requirement for one material such that the element of that material can have shallow curves, and with a secondary mirror power, determined by the geometry, such as to require a shallow convex mirror surface R7, then that material is used for the Mangin secondary mirror 2. The materials for the lens elements 3 and 4 are preferably ordered so as to provide elements roughly bent round the incoming and outgoing rays to give generally lower surface contributions of aberration.

With an infra-red telescope designed to operate over the 3 to 12 micron waveband, the three materials can be germanium zinc selenide and zinc sulphide. With a shallow convex mirror surface R7, and a low germanium power requirement, the Mangin mirror 2 can be of germanium. The zinc selenide and zinc sulphide power requirements can be relatively high (and not suitable for the secondary mirror) and preferably the lens element 3 is of zinc selenide, and the lens element 4 is of zinc sulphide. This arrangement with the zinc sulphide sandwiched between the other two materials gives lens elements roughly bent round the incoming and outgoing rays with resultant generally lower surface contributions of aberration. However, lens element 3 can be of zinc sulphide and lens element 4 of zinc selenide if the reduced performance is tolerable. The lens elements 5, 6, 7 and 8 can be of germanium.

Particular examples employing these materials, with reflecting and refracting surfaces all of spherical curvature, and with the solid elements air spaced, have numerical data as follows, the dimensional units being millimeters (but the values are relative and can be scaled accordingly). In both examples the Mangin mirror 2 and the lens elements 5, 6, 7 and 8 are of germanium. In Example I the lens element 3 is of zinc selenide and the lens element 4 is of zinc sulphide, but in Example II this material order is reversed and the lens element 3 if of zinc sulphide and the lens element 4 is of zinc selenide. The refractive indices of these materials at 4 microns and 10 microns wavelength are as follows:

|  | 4 Microns $N_4$ | 10 Microns $N_{10}$ |
|---|---|---|
| Germanium | 4.0240 | 4.00324 |
| Zinc Selenide | 2.4332 | 2.40655 |
| Zinc Sulphide | 2.2550 | 2.2002 |

Their V values, or constringences, for each waveband are as follows:

|  | 3 to 5 Microns 3–5 $V_4$ | 8 to 12 Microns 8–12 $V_{10}$ |
|---|---|---|
| Germanium | 104.3 | 868.0 |
| Zinc Selenide | 176.9 | 57.9 |
| Zinc Sulphide | 113.8 | 22.9 | where $$V_4^{3-5} = \frac{N_4 - 1}{N_3 - N_5}$$

and $$V_{10}^{8-12} = \frac{N_{10} - 1}{N_8 - N_{12}}$$

the subscripts indicating wavelength in microns.

| Surface | Radius of Curvature | Axial Thickness or Separation |
|---|---|---|
| R1 | −586.064 | |
| | | 196.070 |
| R2 | −783.781 | |
| | | 3.810 |
| R3 | −165.261 | |
| | | 0.762 |
| R4 | −143.865 | |
| | | 7.620 |
| R5 | −210.234 | |
| | | 7.620 |
| R6 | −836.379 | |
| | | 13.970 |
| R7 | −1055.431 | |
| | | 190.525 |
| R2 to R8 | | |
| R8 | +87.336 | |
| | | 6.350 |
| R9 | +159.102 | |
| | | 38.786 |
| R10 | −75.415 | |
| | | 2.540 |
| R11 | +458.890 | |
| | | 2.449 |
| R12 | −107.687 | |
| | | 15.890 |
| R13 | −56.244 | |
| | | 0.500 |
| R14 | +56.523 | |
| | | 4.395 |
| R15 | +117.914 | |

The telescope has an angular magnification of ×20, and an angular field coverage of 3.6° in object space giving an angular output of 72° total field. The entrance pupil diameter is 200 mm and the exit pupil diameter is 10 mm, the exit pupil being located 17.88 mm beyond the last surface R15. The obscuration ratio is 0.43.

| Surface | Radius of Curvature | Axial Thickness or Separation |
|---|---|---|
| R1 | −577.063 | |
| | | 194.078 |
| R2 | −855.017 | |
| | | 10.160 |
| R3 | +968.578 | |
| | | 1.524 |
| R4 | +1466.767 | |
| | | 3.81 |
| R5 | −242.457 | |
| | | 5.08 |
| R6 | −958.816 | |
| | | 13.970 |
| R7 | −857.471 | |
| | | 207.586 |
| R2 to R8 | | |
| R8 | +88.469 | |
| | | 6.350 |
| R9 | +164.801 | |
| | | 43.053 |
| R10 | −75.415 | |
| | | 2.540 |
| R11 | +458.890 | |
| | | 2.449 |
| R12 | −107.687 | |
| | | 15.890 |
| R13 | −56.244 | |
| | | 0.500 |
| R14 | +56.523 | |
| | | 4.395 |
| R15 | +117.914 | |

It will be noted that in Example II the curvature of surfaces R3 and R4 is of opposite sign to that in Example I. In Example II therefore the lens element 3 is biconvex and the lens element 4 is biconvex instead of two meniscus elements as shown in the drawing. It will be understood that these lens shapes are less well bent around the incoming and outgoing rays than the meniscus shapes of Example I with resultant generally higher surface contributions of aberration and corresponding lower performance as previously indicated.

I claim:

1. A catadioptric lens comprising a primary mirror having an opening, a Mangin secondary mirror of a first optically transmissive material, and a pair of refracting lens elements respectively of second and third optically transmissive materials different from each other and from said first optically transmissive material, said pair of elements being disposed in the light paths between the primary mirror and the Mangin secondary mirror and between the Mangin secondary mirror and the opening in the primary mirror.

2. A lens according to claim 1 operative over a 3 to 12 micron infra-red waveband in which the three different materials are germanium, zinc sulphide and zinc selenide.

3. A lens according to claim 2 in which the Mangin secondary mirror is of germanium, the element of the pair nearer the Mangin secondary mirror is of zinc sulphide, and the element of the pair further from the Mangin secondary mirror is of zinc selenide.

4. A lens according to claim 1 in which the pair of elements are closely spaced apart and of meniscus form concave towards the Mangin secondary mirror.

5. A lens according to claim 1 in which the Mangin secondary mirror has a convex front surface and an externally concave (internally convex) back reflecting surface.

6. A lens according to claim 1 in which one of the elements of the pair of elements is of positive power and the other is of negative power.

7. A lens according to claim 6 in which the element of the pair further from the Mangin secondary mirror is negatively powered and the element nearer the Mangin secondary mirror is positively powered.

8. A lens according to claim 1 comprising a further refractive lens element of optically transmissive material at or near the opening in the primary mirror.

9. A lens according to claim 8 in which the further refractive lens element is of positive power.

10. A lens according to claim 9 in which the further refractive lens element is of meniscus shape convex towards the Mangin secondary mirror.

11. A lens according to claim 8 in which, for the 3 to 12 micron waveband, the further refractive lens element is of germanium.

12. An afocal telescope of non-Galilean form including a catadioptric lens according to claim 1 and associated with an eyepiece system.

13. A telescope according to claim 12 in which the eyepiece system comprises three refractive lens elements of optically transmissive material.

14. A telescope according to claim 12 in which, for the 3 to 12 micron waveband, the transmissive material is germanium.

15. A telescope according to claim 13 in which the three refractive lens elements comprise a negatively powered front element (i.e. towards the catadioptric lens), a central positively powered element having a convex rear surface, and a back positively powered element with a convex front surface and a curved rear surface.

16. A telescope according to claim 15 in which the negatively powered element is biconcave, the central positively powered element is meniscus in shape, and the back positively powered element is also meniscus in shape.

* * * * *